Jan. 2, 1945. R. E. WELCH 2,366,302
OIL EMULSION SEPARATING
Filed Dec. 2, 1941 3 Sheets-Sheet 1
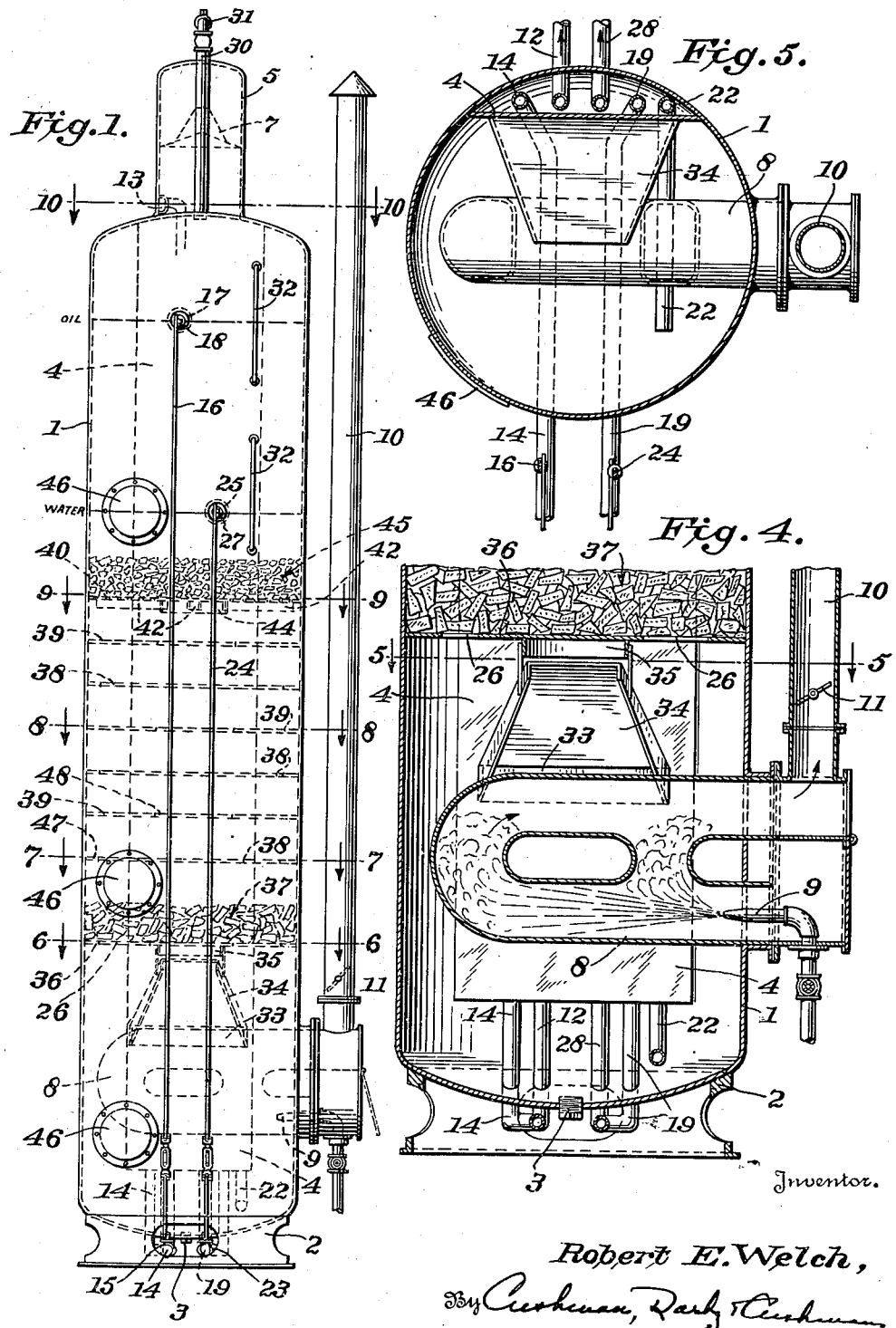
Inventor.
Robert E. Welch,
By Cushman, Darby & Cushman
Attorneys.

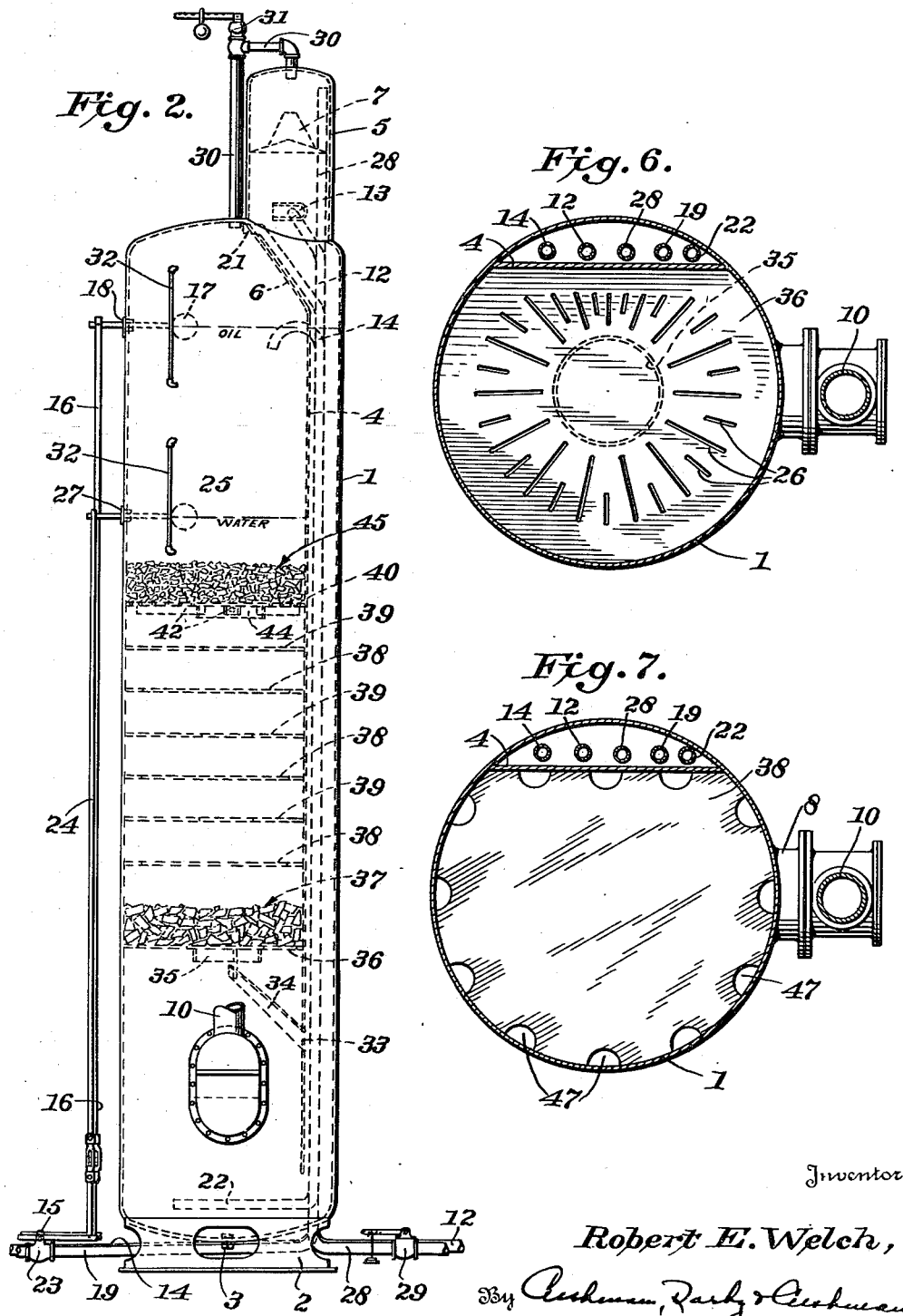

Jan. 2, 1945.  R. E. WELCH  2,366,302
OIL EMULSION SEPARATING
Filed Dec. 2, 1941  3 Sheets-Sheet 3
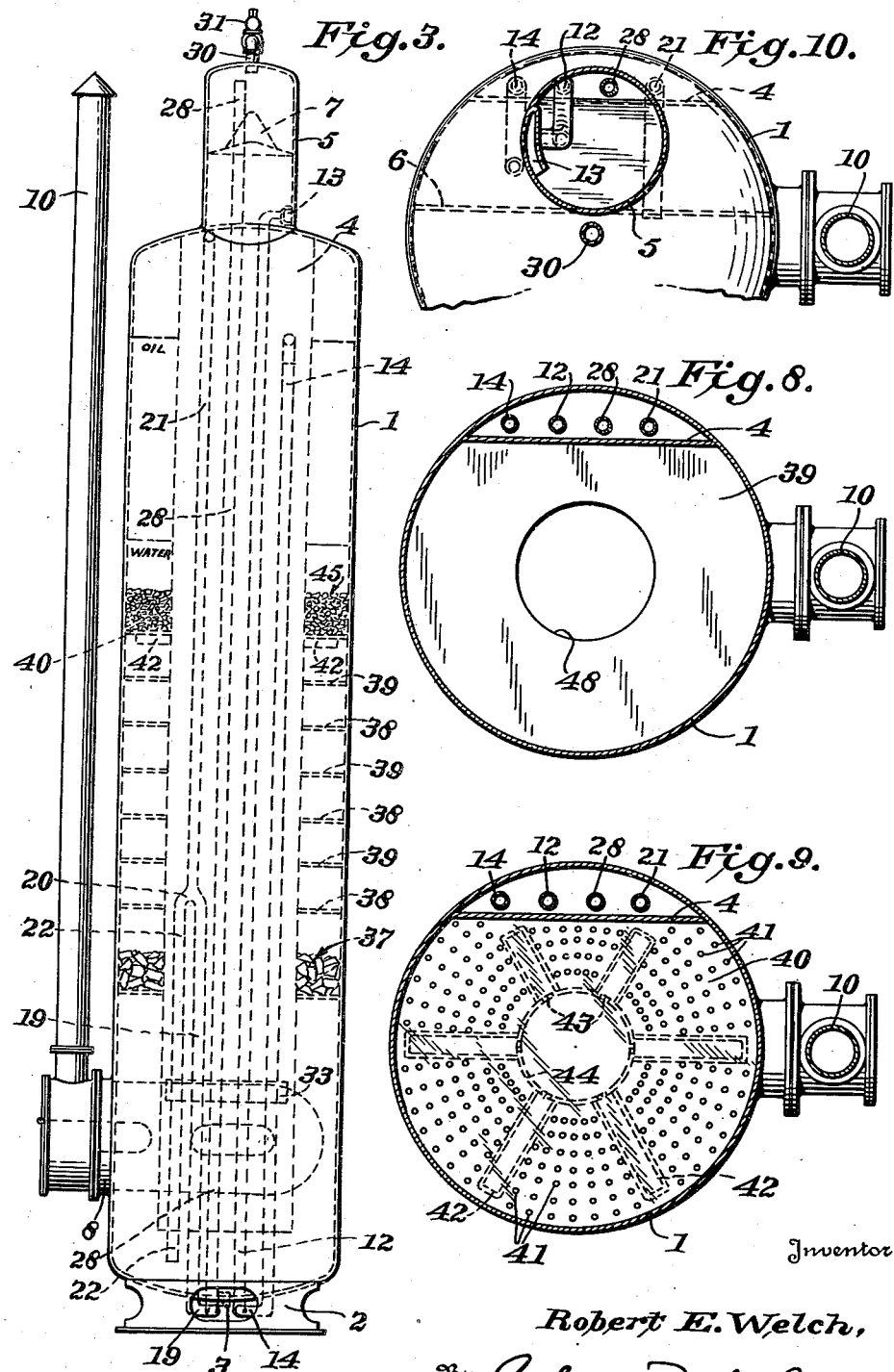
Inventor:
Robert E. Welch,
By Ashmun, Darby & Cushman
Attorneys.

Patented Jan. 2, 1945

2,366,302

UNITED STATES PATENT OFFICE 2,366,302

OIL EMULSION SEPARATING

Robert E. Welch, Houston, Tex., assignor to Nowery J. Smith, Houston, Tex., doing business as Nowery J. Smith Supply Company Application December 2, 1941, Serial No. 421,388

4 Claims. (Cl. 252—348)

This invention relates to a method and apparatus for separating an oil, gas and water emulsion continuously in an upright separator chamber and relates more particularly to that type of separator tank having means for preliminarily separating the gas from the emulsion together with means for heating the remaining emulsion to separate the oil and water.

The principal object of this invention is to provide an oil separator of the class described in which the oil and water emulsion may be efficiently separated with a minimum of disturbance to the emulsion due to the entrained gas bubbling through the emulsion as it passes the scrubbing baffles.

It is more particularly an object of the present invention to provide an oil emulsion separator of the class described in which the oil emulsion is preheated and preliminarily separated from a large part of its entrained gas whereupon the remaining emulsion consisting mainly of oil and water is discharged into the main separator tank at a point above the fire tube heater thus minimizing the possibility of an instantaneous release of any amounts of volatile gases remaining in the oil and water emulsion which would tend to disturb the passage of the emulsion in its upward passage through the separating and scrubbing baffles.

It is a further object of this invention to provide an oil emulsion separator structure of the type comprising an upright tank provided with a fire tube heater and having a preliminary gas scrubbing chamber in association therewith in which all of the piping incident to the separator including the oil emulsion inlet and the oil, gas and water outlet pipes enter the separator tank at the bottom and extend within the tank to their respective destinations thus eliminating the overhead field piping commonly used in connection with oil separators.

It is a further object of the present invention to provide an oil emulsion separator structure of the class described in which the oil emulsion inlet pipe entering the separator tank at the bottom and extending within said tank to the preliminary gas scrubbing chamber is subjected to heat whereby the oil emulsion is preliminarily heated before separating the gas therefrom.

Another object of the invention is to provide an oil separator of the class described in which the water outlet pipe is provided with a siphon extension whereby the height of the level of separated water in the tank is maintained always above a predetermined point.

Another object of the invention is to provide an improved method for separating an oil, gas and water emulsion.

Further objects and advantages of the invention will appear as the description proceeds in connection with the drawings wherein:

Figure 1 is a front elevation of the complete separator tank;

Figure 2 is a side elevation of the separator tank structure;

Figure 3 is a rear elevation of the separator tank showing the arrangement of the inlet and outlet pipes within the tank;

Figure 4 is an enlarged fragmental vertical section of the bottom portion of the separator tank as viewed from the front and showing in detail the fire tube heater together with the spreader outlet extending from the opening in the flume within the separator chamber;

Figure 5 is a horizontal section taken on the line 5—5 of Figure 4 showing further details of the spreader outlet extending from the flume and also showing the position of the separator inlet and outlet pipes within the flume;

Figure 6 is a horizontal section taken on the line 6—6 of Figure 1 showing the type of scrubbing or baffle plate used at that point;

Figure 7 is a horizontal section taken on the line 7—7 of Figure 1 showing the configuration of the openings in the baffle plate used at that point;

Figure 8 is a horizontal section taken at the line 8—8 of Figure 1 showing the configuration of the openings in the baffle plate used at that point in the separator structure;

Figure 9 is a horizontal section taken at the line 9—9 of Figure 1 showing the type of baffle plate used at that point in the separator structure to insure an even distribution of the emulsion over said plate and into the crushed brick supported by said plate; and Figure 10 is a horizontal section taken on the line 10—10 of Figure 1 to show details of the preliminary gas scrubbing chamber and the discharge end of the oil emulsion inlet pipe at the point where it enters the preliminary gas scrubbing chamber.

Referring more in detail to the drawings, numeral 1 denotes the metal shell or wall constituting the upright separator tank which is supported in an upright position upon the base or standard 2. The separator tank is provided with a conventional plug 3 at the bottom whereby sludge deposited on the bottom of the tank can be removed. Positioned within and to one side of the tank and extending from the top of the tank to a point above the bottom of the tank is the metal plate 4 forming a compartment or flume between the wall of the plate 4 and the shell or wall 1 of the separating tank. A preliminary gas scrubbing chamber generally shown at 5 is located on the top of the tank 1 and is in communication with the flume formed by the baffle plate 4 and tank wall 1. As will be noted by reference to Figure 2 of the drawings, the baffle plate 4 is shaped to extend as at 6 into communication with the bottom of the preliminary gas scrubbing chamber 5. The preliminary gas scrubbing chamber 5 is provided with baffles 7 to facilitate the separation of gas from the oil, gas and water emulsion.

The separator tank 1 is provided with a fire tube heater 8 of conventional design extending into the bottom portion of said separating tank. A burner nozzle 9 is located within the fire tube heater and is provided with the flue pipe 10 and damper 11 for regulating the amount of heat supplied to the heater 8 and separator chamber.

The separator tank is provided with an oil emulsion inlet pipe, an oil outlet pipe, a gas outlet pipe and a water outlet pipe all of which enter the tank at the bottom and extend through the flume formed by the plate 4 and the wall 1 of the tank to their respective destinations. The oil emulsion inlet pipe 12 enters the tank at the bottom and extends within the flume to a discharge outlet 13 tangentially positioned on the wall 5 of the preliminary gas scrubbing chamber. An enlarged detail view of this discharge outlet for the oil emulsion inlet pipe is shown in Figure 10 of the drawings. The oil outlet pipe 14 enters the separator tank at the bottom and extends within the flume to the level of separated oil maintained in the tank. The oil outlet pipe 14 is provided with a float operated valve 15 connected by suitable rodding 16 to the float 17 pivotally mounted within the separator tank at the oil level by means of a conventional stuffing box 18. The water outlet pipe entering the tank at the bottom and extending into the flume is provided with a siphon attachment to prevent the withdrawal of water below a predetermined low point and thus prevent any damage to the fire tube heater. The water outlet pipe 19, as clearly shown in Figure 4 of the drawings, enters the tank at the bottom and extends to the point 20 shown in Figure 3 where it connects with a siphon breaking pipe 21 extending to the top of the tank and communicating with the gas chamber at the top of the tank. The pipe 22 extending to the bottom of the separator tank also connects with the siphon pipe 21 and water outlet pipe 19 at the point 20. The water is withdrawn through pipes 22 and 19 and the siphon breaking pipe 21 acts to prevent the further withdrawal of water after the level of water in the separating tank has fallen to a level below the point 20. The water outlet pipe 19 is also provided with a float operated valve 23 connected by suitable rodding 24 to the float 25 pivotally mounted within the separating tank at the water level by means of a conventional stuffing box 27. The gas outlet pipe 28 enters the tank at the bottom and extends within the flume to the top of the preliminary gas separating chamber. The gas outlet pipe is provided with an automatic pressure responsive weight operated valve 29 by means of which the pressure of gas within the separating tank and preliminary gas separating chamber may be regulated. The equalizing piping 30 connects the gas chamber in the top of the separating tank with the top of the preliminary gas scrubbing tank thus equalizing the gas pressure in the separating tank and gas scrubbing tank and communicating the gas chamber of the separating tank with the gas outlet pipe 28. A weight controlled safety valve 31 opening into the atmosphere is also provided to discharge the gas from the separating tank or preliminary gas scrubbing chamber into the atmosphere in the event that the pressure within the chambers should become dangerously high.

Sight gages 32 are provided on the outside of the tank by means of which the levels of separated oil and water may be observed.

The baffle plate 4 constituting a wall of the flume is provided with a rectangular opening 33. Extending from the opening 33 into the separator tank is an inverted trough 34 constituting a spreader outlet. This trough as will be observed by reference to Figures 2 and 4 of the drawings extends above the fire tube heater into proximity with an inverted bucket-shaped baffle 35 on the bottom of the separator plate 36. The details of the openings 26 in the separator plate 36 are shown clearly by Figure 6 of the drawings. Supported by the separator plate 36 is a layer of crushed brick 37. Above the separator plate 36 are alternately positioned baffles 38 and 39. The detailed configuration of the openings 47 in baffle 38 is shown in Figure 7 and the detail of the opening 48 of baffle 39 is shown in Figure 8. Above the baffle plates 38 and 39 is positioned a baffle plate 40 shown in detail in Figure 9. This baffle plate in addition to the small perforations 41 is provided with a series of inverted troughs 42 which communicate through openings 43 with the inverted bucket-shaped baffle 44 on the bottom of baffle plate 40 to insure even deflection of emulsion over the entire baffle area as will be readily understood. Supported by the baffle 40 within the separator chamber is a layer of finely crushed rock 45 above which the separation of the oil and water emulsion will be complete.

The wall 1 of the separating tank is provided with handholes 46 by means of which access may be had to the interior of the tank for cleaning or the like operations.

The operation of the separator is as follows:

The oil, gas and water emulsion passes through the emulsion inlet pipe located within the flume at the side of the tank whereby it is preliminarily heated due to the fact that the oil emulsion inlet pipe is surrounded by the heated emulsion in the main separator tank. The oil, gas and water emulsion is discharged at the discharge outlet 13 into the preliminary gas scrubbing chamber where a large amount of the gas is separated out. The emulsion is given a circular or swirling motion due to the tangential location of the discharge outlet 13. This swirling motion cooperates with the deflecter plate 7 to facilitate the separation of the gas. After the preliminary gas separation, the emulsion passes down the flume provided by the plate 4 and the wall 1 of the separating tank where a further settling of water from the emulsion takes place. The emulsion is then discharged into the main separator chamber through the spreader outlet formed by the opening 33 and the inverted trough 34 while the settled water passes on down the flume to the bottom of the tank where it is withdrawn by the water outlet pipe 22. The design of the spreader outlet is such that the oil emulsion is prevented from directly contacting the fire tube heater 8 and is conducted or guided by the inverted trough 34 into the inverted bucket 35 on the bottom of the baffle 36 which deflects the emulsion evenly over the entire baffle 36. The emulsion then passes upwardly through baffle 36, crushed rock 37, baffles 38 and 39 to the underside of baffle 40. The design of baffles 38 and 39 is such as to prolong the passage of the emulsion and thus insure adequate scrubbing to separate the oil and water. The flow of the emulsion is further guided by the troughs 42 on the bottom of the baffle plate 40. These troughs communicate through perforations 43 with an inverted bucket-shaped baffle 44 on the bottom of baffle 40 and the emulsion is thereby deflected over the entire area of the baffle 41 thus insuring even distribution of the emulsion as it passes through the perforations 41 into the crushed rock 45.

Small amounts of gas which are still present in the emulsion when it enters the separator tank are separated from the emulsion during its passage through the baffle plates and crushed rock and this separated gas collects at the top of the separating tank where it is drawn off by means of the equalizing pipe 30 and gas discharge pipe 29.

The separated oil and water are maintained at desired levels by the float operated valves in the oil outlet and water outlet pipes. These valves operated in combination with the automatic pressure valve on the gas outlet pipe may be regulated to insure a continuous operation of the oil separator and maintain the levels of separated oil, gas and water at desired heights.

It is an important feature of the present invention that the spreader outlet comprising the opening 33 and inverted trough 34 is so designed as to prevent a direct contact of the oil emulsion with the fire tube heater. If the oil emulsion should directly contact the fire tube heater, the volatile gases remaining in the oil emulsion would be instantaneously liberated and would bubble up through the emulsion flowing through the separator plates and thereby agitate and disturb the emulsion in its passage through the separating plates and interfere with the scrubbing operation whereby the water and oil emulsion is separated. By directing the oil emulsion away from the fire tube heater as is done with the spreader outlet in the present invention, the instantaneous liberation of entrained gas is minimized and the scrubbing action of the baffle plates is greatly facilitated.

The siphon provided in connection with the water outlet pipe is also an important feature of the present invention in that it prevents an accidental lowering of the level of the water in the separator tank below the predetermined point 20 at which the water outlet pipe joins with the siphon extension 21. This serves to prevent any possibility of the water becoming so low as to expose the fire tube heater to damage.

The separator tank disclosed in the present invention further provides an advantageous new design in which all overhead field piping is eliminated in the fact that all of the piping used in connection with the separator enters the separator tank at the bottom and extends within the tank to the respective destinations for said piping.

The invention having been thus described, what I claim as new and desire to secure by Letters Patent is:

1. In an apparatus for separating an oil and gas emulsion, a tank, means to maintain a body of water in the lower portion of the tank and a body of oil above the water, means positioned centrally of the body of water to directly heat the water, means to deliver oil and water to the body of water at a point substantially laterally opposite said heating means, and means to cause the incoming oil to rise through the body of water in a stream spaced from the heater but downwardly open to the body of water so that water in the stream may separate therefrom.

2. In an apparatus for separating an oil and gas emulsion, a tank, means to maintain a body of water in the lower portion of the tank and a body of oil above the water, means positioned centrally of the body of water to directly heat the water, means to deliver oil and water to the body of water at a point substantially laterally opposite said heating means, and means to cause the incoming oil to rise through the body of water in a stream spaced from the heater but downwardly open to the body of water so that water in the stream may separate therefrom, comprising an upwardly inclined plate element beneath and along which the oil in the stream may ascend.

3. In an apparatus for separating an oil and gas emulsion, a tank, means to maintain a body of water in the lower portion of the tank and a body of oil above the water, means positioned centrally of the body of water to directly heat the water, means to deliver oil and water to the body of water at a point substantially laterally opposite said heating means, and means to cause the incoming oil to rise through the body of water in a stream spaced from the heater but downwardly open to the body of water so that water in the stream may separate therefrom, comprising an upwardly inclined plate element beneath and along which the oil in the stream may ascend, said plate being provided with depending flanges at its lateral edges.

4. In an apparatus for separating an oil and gas emulsion, a tank, means to maintain a body of water in the lower portion of the tank and a body of oil above the water, means positioned centrally of the body of water to directly heat the water, means to deliver oil and water to the body of water at a point substantially laterally opposite said heating means, and means to cause the incoming oil to rise through the body of water in a stream spaced from the heater but downwardly open to the body of water so that water in the stream may separate therefrom, comprising an upwardly inclined plate element beneath and along which the oil in the stream may ascend, said plate being provided with depending flanges at its lateral edges and the flanges laterally converging at the upper end of the plate.

ROBERT E. WELCH.